US009443284B1

(12) United States Patent
Wang et al.

(10) Patent No.: US 9,443,284 B1
(45) Date of Patent: Sep. 13, 2016

(54) METHODS FOR AWB (AUTOMATIC WHITE BALANCE) COMPENSATION AND APPARATUSES USING THE SAME (71) Applicant: VIA Alliance Semiconductor Co., Ltd., Shanghai (CN)

(72) Inventors: Xu Wang, Beijing (CN); Nan Qi, Beijing (CN)

(73) Assignee: VIA ALLIANCE SEMICONDUCTOR CO., LTD., Shanghai (CN)

(*) Notice: Subject to any disclaimer, the term of this patent is extended or adjusted under 35 U.S.C. 154(b) by 0 days.

(21) Appl. No.: 14/806,915

(22) Filed: Jul. 23, 2015

(30) Foreign Application Priority Data

Mar. 17, 2015 (CN) .......................... 2015 1 0117455

(51) Int. Cl.
G06K 9/00 (2006.01)
G06T 5/00 (2006.01)
G06K 9/46 (2006.01)
G06K 9/52 (2006.01)
G06T 7/00 (2006.01)
G06T 7/40 (2006.01)

(52) U.S. Cl.
CPC .............. *G06T 5/00* (2013.01); *G06K 9/4604* (2013.01); *G06K 9/4642* (2013.01); *G06K 9/4652* (2013.01); *G06K 9/4661* (2013.01); *G06K 9/52* (2013.01); *G06T 7/0085* (2013.01); *G06T 7/408* (2013.01); *G06K 2009/4666* (2013.01); *G06T 2207/20021* (2013.01)

(58) Field of Classification Search
USPC ................ 382/167, 162; 348/220.1, E5.024; 375/240; 386/224, 333
See application file for complete search history.

(56) References Cited

U.S. PATENT DOCUMENTS

| 6,690,881 | B1* | 2/2004 | Tomita | H04N 5/225 348/E5.024 |
| 6,747,694 | B1 | 6/2004 | Nishikawa et al. | |
| 8,194,143 | B2* | 6/2012 | Tomita | H04N 5/225 348/220.1 |
| 2011/0050950 | A1 | 3/2011 | Nomura | |
| 2012/0262600 | A1 | 10/2012 | Velarde et al. | |

FOREIGN PATENT DOCUMENTS

JP          62005793 A  *  1/1987  .............. H04N 7/93

* cited by examiner

*Primary Examiner* — Anh Do
(74) *Attorney, Agent, or Firm* — McClure, Qualey & Rodack, LLP (57) ABSTRACT A method for AWB (Automatic White Balance) compensation, performed by a processing unit, the method at least containing acquiring a frame 0; dividing the frame 0 into blocks; obtaining block statistics information of each block of the frame 0; labeling each block of the frame 0 as one type according to its block statistics information; employing a first AWB compensation to the frame 0 with an input of first-type blocks of the frame 0, wherein the first-type blocks of the frame 0 are blocks labeled as a first type; employing a second AWB compensation to a frame 1 with an input of blocks of the frame 1 at the same locations as that of second-type blocks of the frame 0, wherein the second-type blocks of the frame 0 are blocks labeled as a second type; and fusing the compensated frame 0 with the compensated frame 1.

22 Claims, 7 Drawing Sheets

METHODS FOR AWB (AUTOMATIC WHITE BALANCE) COMPENSATION AND APPARATUSES USING THE SAME

CROSS REFERENCE TO RELATED APPLICATIONS

This application claims the benefit of China Patent Application No. 201510117455.6, filed on Mar. 17, 2015, the entirety of which is incorporated by reference herein.

BACKGROUND

1. Technical Field

The present invention relates to image processing, and in particular, it relates to methods for AWB (Automatic White Balance) compensation and apparatuses using the same.

2. Description of the Related Art

HDR (High Dynamic Range) images can show a greater range of luminance levels captured in real-world scenes, from direct sunlight to a faint nebula. It is often achieved by capturing and then combining different exposures of the same subject matter. Non-HDR cameras take photographs with a limited exposure range, resulting in the loss of detail in saturate or dark areas. HDRM (High Dynamic Range Merging) compensates for this loss of detail by capturing multiple photographs at different exposure levels and combining them to produce a photograph representative of a broader tonal range. LDR (Low Dynamic Range) images each may contain parts with different color temperatures and it will produce a color-biased HDR image if fusing the LDR images directly. AWB (Automatic White Balance) adjusts gains of color channels to correct the color bias resulting from differences in the ambient illumination conditions, thereby enabling an image to be obtained to reflect realistic colors. Conventionally, a unified AWB is applied to the overall image frame. However, an image frame usually contain parts with different color temperatures, thus a unified AWB applying to parts with different color temperatures cannot compensate the color bias to appear neutral in the reproduction. Thus, methods for AWB compensation and apparatuses using the same are introduced to improve the AWB accuracy of the generated HDR image.

BRIEF SUMMARY

An embodiment of a method for AWB (Automatic White Balance) compensation, performed by a processing unit, is introduced. The method at least contains: acquiring a frame 0; dividing the frame 0 into a plurality of blocks; obtaining block statistics information of each block of the frame 0; labeling each block of the frame 0 as one type according to its block statistics information; employing a first AWB compensation to the frame 0 with an input of first-type blocks of the frame 0, wherein the first-type blocks of the frame 0 are blocks labeled as a first type; employing a second AWB compensation to a frame 1 with an input of blocks of the frame 1 at the same locations as that of second-type blocks of the frame 0, wherein the second-type blocks of the frame 0 are blocks labeled as a second type; and fusing the compensated frame 0 with the compensated frame 1.

An embodiment of an apparatus for AWB compensation is introduced. The apparatus at least contains: a camera module controller coupled to a camera module; and a processing unit. The processing unit acquires a frame 0 via the camera module controller; divides the frame 0 into a plurality of blocks; obtains block statistics information of each block of the frame 0; labels each block of the frame 0 as one type according to its block statistics information; employs a first AWB compensation to the frame 0 with an input of first-type blocks of the frame 0, wherein the first-type blocks of the frame 0 are blocks labeled as a first type; employs a second AWB compensation to a frame 1 with an input of blocks of the frame 1 at the same locations as that of second-type blocks of the frame 0, wherein the second-type blocks of the frame 0 are blocks labeled as a second type; and fuses the compensated frame 0 with the compensated frame 1.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
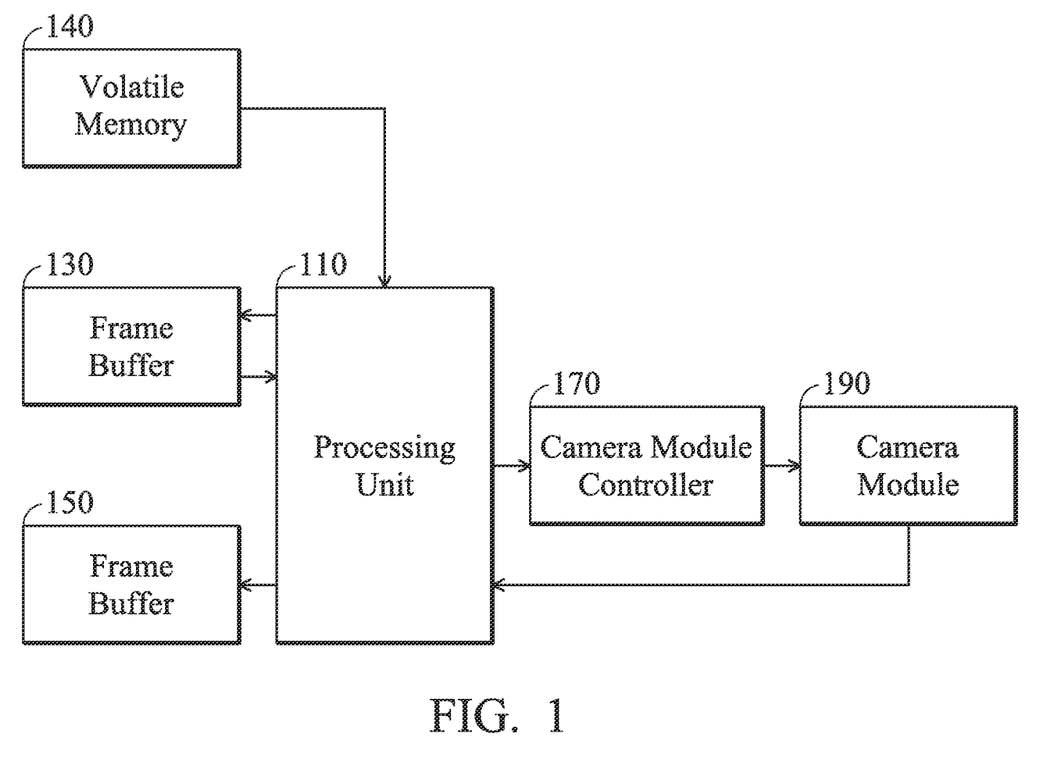
FIG. 1 is a schematic diagram illustrating the system architecture of a computer apparatus according to an embodiment of the invention.

FIG. 1 is a schematic diagram illustrating the system architecture of a computer apparatus according to an embodiment of the invention. The system architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 110 may, via a camera module controller 170, control a camera module 190 to capture multiple LDR (Low Dynamic Range) frames and store the LDR frames in a frame buffer 130. The camera module 190 may comprise an image sensor, such as a CMOS (complementary metal-oxide-semiconductor) or CCD (charge-coupled device) sensor, to detect an image in the form of a red, green and blue color, and readout electronic circuits for collecting the sensed data from the image sensor. The processing unit 110 may obtain at least three LDR frames from the frame buffer 130. In an embodiment, the three LDR frames are 12-bit frames. One LDR frame is captured by an AE (Automatic Exposure) algorithm under the optimized exposure settings, referred to as the frame 0 hereinafter. It should be noted that the exposure settings for capturing the frame 0 include a shutter speed, an analog gain and a digital gain and are stored in the frame buffer 130 or a volatile memory 140. The volatile memory 140, such as a DRAM (Dynamic Random Access Memory), for storing necessary data in execution, such as runtime variables, data tables, etc. Another LDR frame is a low-exposure frame, referred to hereinafter as the frame 1. Yet another LDR frame is a high-exposure frame, referred to hereinafter as the frame 2. The processing unit 110 fuses the frames 0 to 2 by using an HDRM (High-Dynamic-Range Merging) algorithm to generate an HDR (High Dynamic Range) frame and stores the generated HDR frame in the frame buffer 150. In an embodiment, the output HDR frame is an 18-bit frame.

Figure 2:
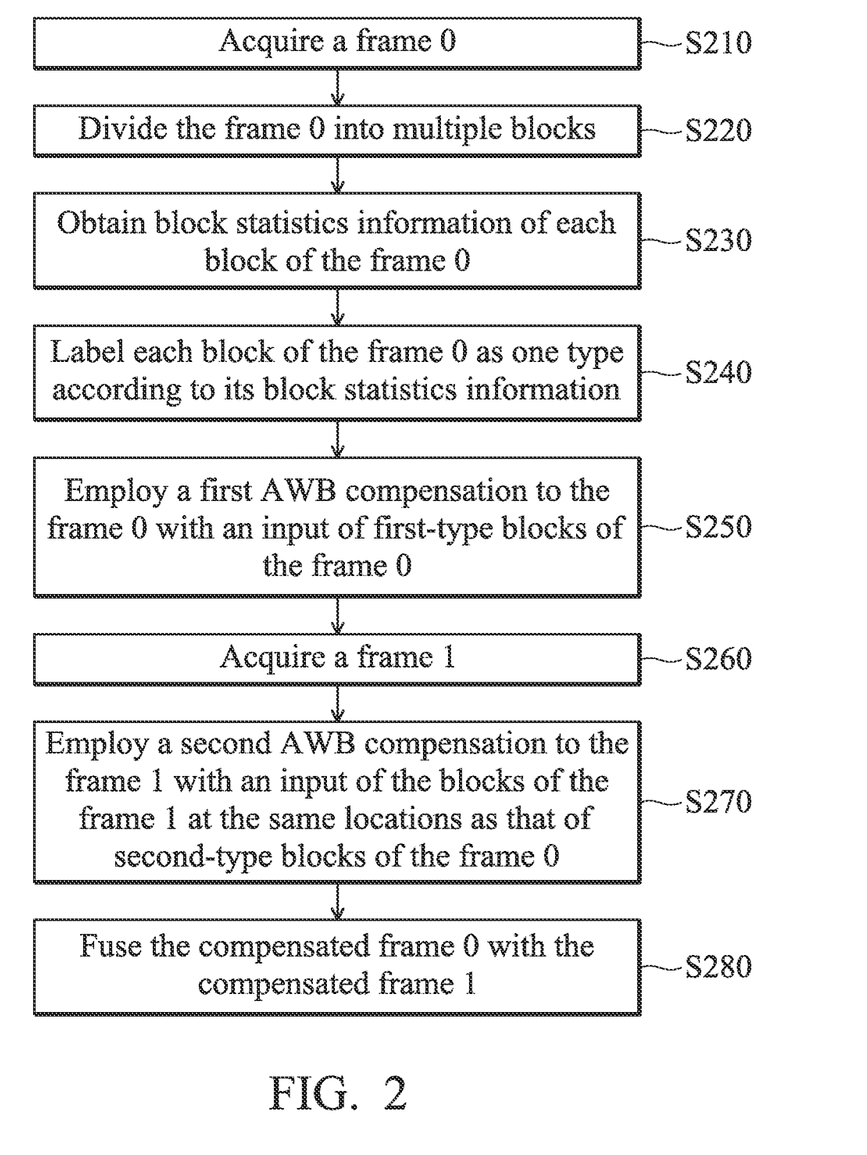
FIG. 2 is a flowchart illustrating a method for AWB, which is performed by a processing unit, according to an embodiment of the invention.

FIG. 2 is a flowchart illustrating a method for AWB compensation, which is performed by a processing unit, according to an embodiment of the invention. The process begins with acquisition of a frame 0 (step S210). Thereafter, the frame 0 is divided into multiple blocks (step S220), block statistics information of each block of the frame 0 is obtained (step S230) and each block of the frame 0 is labeled as one type according to its block statistics information (step S240). The processing unit 110 employs a first AWB compensation to the frame 0 with an input of the first-type blocks of the frame 0, wherein the first-type blocks of the frame 0 are blocks labeled as a first type (step S250). In an embodiment, the block types include a normal-exposure, a low-exposure and a high-exposure. Since the frame 0 is a normal-exposure frame of LDR, the first AWB compensation is employed to the frame 0 with an input of the blocks labeled as the normal-exposure type. The AWB compensation typically maintains the G-channel and adjusts gains of the R-channel and the B-channel pixels according to calculation results. In an embodiment, the processing unit 110 calculates statistics of all blocks of the frame 0, which are labeled as the first type (such as normal-exposure), and adjusts R-channel and B-channel gains of all pixels of the frame 0 according to the calculation results. Detailed calculations of the AWB compensation depend on which algorithm is employed. Typical AWB algorithms include the gray world assumption, the perfect reflector assumption, the color temperature estimation and so on. Taking the gray world assumption as an example, the processing unit 110 accumulates pixel values of the R-, G- and B-channels of blocks labeled as the first type (for example, normal-exposure) to obtain gains for adjusting the R- and B-channels of the frame 0, thereby enabling, after adjustment, the pixel-value accumulations of the R-, B- and G-channels to be equal.

In addition, a frame 1 is acquired (step S260). In an embodiment, the frame 1 is a LDR low-exposure frame. A second AWB compensation is employed to the frame 1 with an input of the blocks of the frame 1 at the same locations as that of second-type blocks of the frame 0, where the second-type blocks of the frame 0 are blocks labeled as a second type (step S270). In an embodiment, the blocks are labeled as, for example, the low-exposure type. The compensated frame 0 is fused with the compensated frame 1 (step S280). With the AWB compensation applied in a HDR-image generation, which is introduced by the invention, different parts of the fused HDR frame undergo different AWB compensations, such as the aforementioned first and second AWB compensations, that is, each part is compensated by a certain extent of AWB according to its luminance value. Since the parts with different luminance values usually have different color temperatures, it may compensate the color bias more accurately to appear neutral in the reproduction by applying different AWB compensations to different color-temperature parts.

Figure 3:
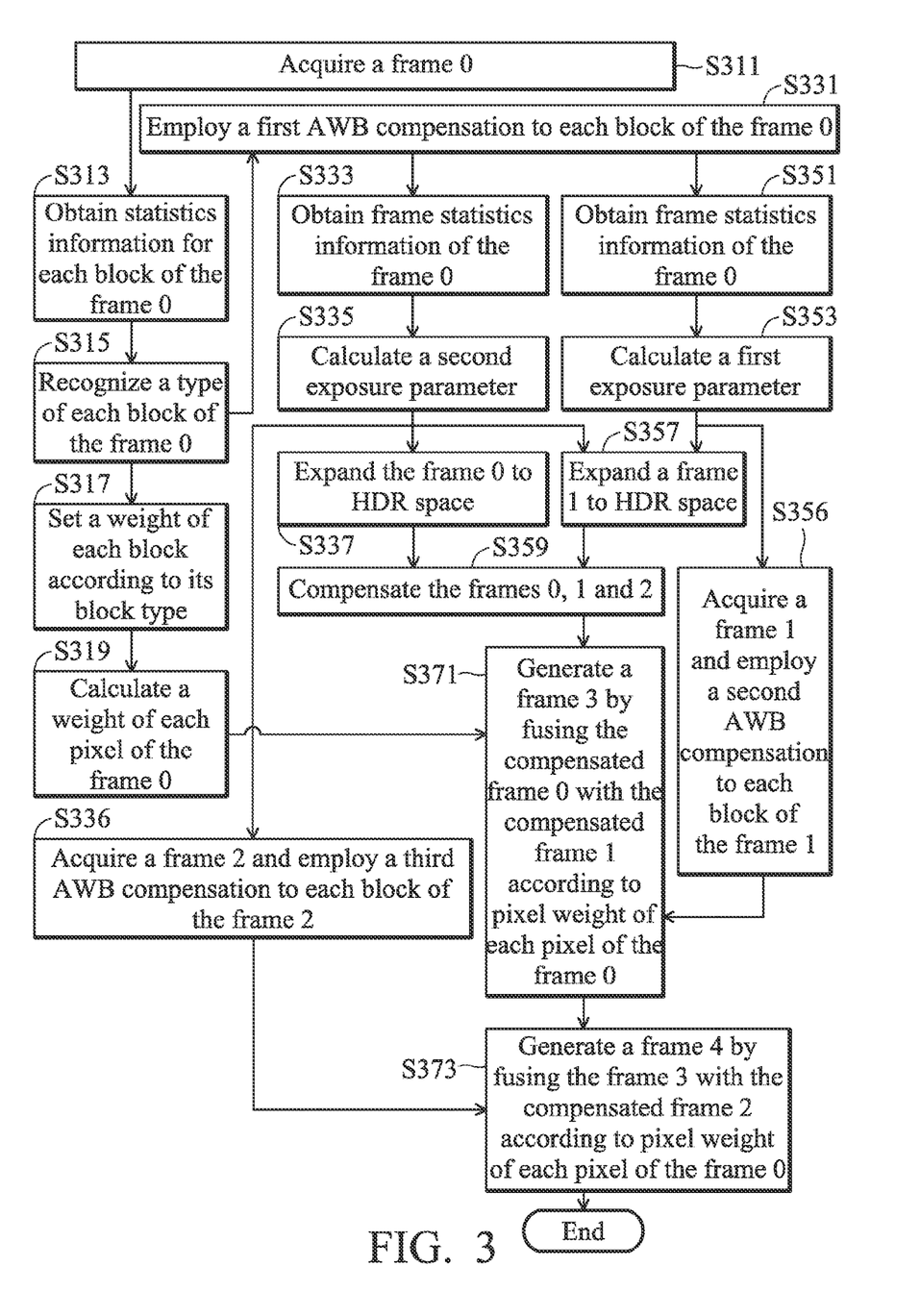
FIG. 3 is a flowchart illustrating a method for AWB compensation in a fusing of HDR images, which is performed by a processing unit, according to an embodiment of the invention.
Figure 5:
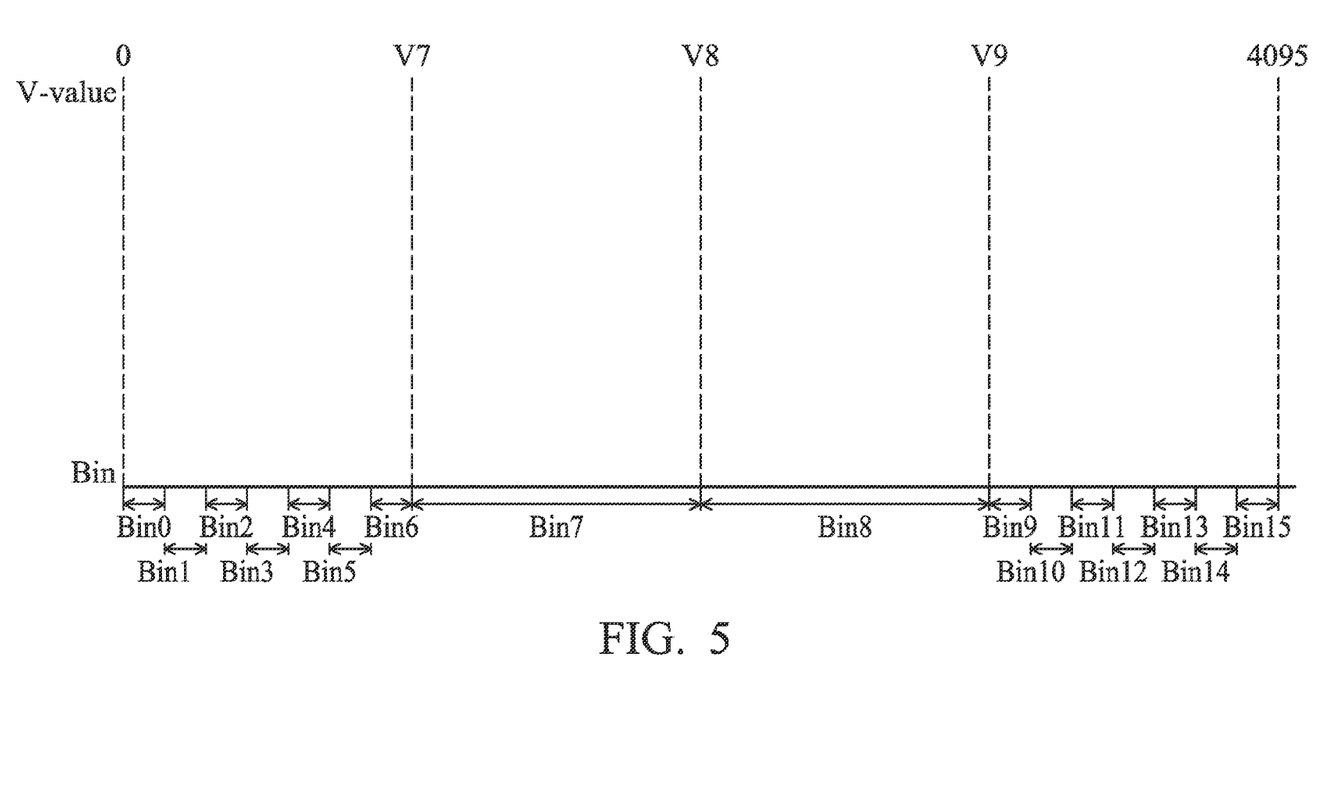
FIG. 5 is a schematic diagram of a luminance histogram for a block according to an embodiment of the invention.

FIG. 3 is a flowchart illustrating a method for AWB compensation in a fusing of HDR images, which is performed by a processing unit, according to an embodiment of the invention. The process begins to acquire a frame 0 from the frame buffer 130 (step S311). Next, the processing unit 110 obtains statistics information for each block of the frame 0 (step S313). Specifically, the frame 0 may be divided into m×n blocks and each block contains, for example, 32×32 pixels, and the luminance value of each pixel is calculated. The luminance value of each pixel may be calculated using the Equation:

$$V = 0.3 \times R + 0.6 \times G + 0.1 \times B \tag{1}$$

where R indicates a red value, G indicates a green value, B indicates a blue value and V indicates a luminance value. The processing unit 110 calculates an average luminance AveLum and a luminance histogram of each block. FIG. 5 is a schematic diagram of a luminance histogram for a block according to an embodiment of the invention. Although the embodiments give 12-bit luminance values ranging from 0 to 4095 as an example, the invention should not be limited thereto. The histogram is divided into, for example, 16 bins, and the minimum luminance value V8 of Bin8 is set to 2047.5(=4095/2). The minimum luminance values V7 of Bin7 and V9 of Bin9 may be calculated using Equations:

$$V7 = 4095 \times r \tag{2}$$

$$V9 = 4095 \times (1-r) \tag{3}$$

where r may be an arbitrary value between 0 and 0.5. Assume that r is set to 0.25: V7 is 1023.75 and V9 is 3071.25. The luminance values between 0 and V7 is divided into seven bins (Bin0~Bin6) equally and the luminance values between V9 and 4095 is divided into seven bins (Bin9~Bin15) equally. The luminance values of the $8^{th}$ bin (Bin7) range from V7 to V8 and the luminance values of the $9^{th}$ bin (Bin8) range from V8 to V9. In each block, the processing unit 110 distributes each pixel to a corresponding bin according to its luminance value and counts how many pixels are presented in each bin. Exemplary pseudo code for generating the histogram is as follows:

```
LowThr = 4096 >> 2; // LowThr = maximum_12bits * 0.25
HighThr = 4096 - LowThr;
valuePerBin = (LowThr / (blockBinNum/ 2 - 1)); // blockBinNum = 16
//for each block
```

-continued

```
for(byIdx = 0; byIdx < block_cnt_y; byIdx ++) {
  for(bxIdx = 0; bxIdx < block_cnt_x; bxIdx ++) {
    lum = image->y[pxlIdx];
    sum += lum;
    if (lum < LowThr) {// (Bin 0~6)
      bin = ((unsigned short)(lum * (((blockBinNum >> 1) - 1) << 2)) >> 12); }
    else if (lum < (maximum_12bits + 1) / 2) {// (Bin 7)
      Bin = ( blockEntryNum / 2 - 1); }
    else if (lum < HighThr) {// (Bin 8)
      Bin = ( blockEntryNum / 2); }
    else {// (Bin 9~15)
      tmpLum = lum - HighThr;
      tmpBin = ((unsigned short)(tmpLum * (((blockBinNum >> 1) - 1) << 2)) >> 12);
      if (tmpBin >= ((blockBinNum >> 1) -1)){
        bin = blockBinNum - 1;}
      else {
        bin = (blockBinNum >> 1) + 1 + tmpBin;}}
    bestExpBlockInfor[curLumSumIdx].block_hist[Bin]++; }
  bestExpBlockInfor[curLumSumIdx].block_averVal = sum / block_size; }
``` where bestExpBlockInfor is a structure array and each structure stores statistics information of one block, which includes a luminance average block_averVal and pixel counts of Bin0 to Bin15 block_hist[Bin].

Subsequently, the processing unit 110 recognizes that each block is a low-exposure type, a normal-exposure type or a high-exposure type according to statistics information obtained by analyzing a luminance average and a histogram of the block (step S315). Specifically, a low-bin threshold and a high-bin threshold within the histogram of one block are calculated. The low-bin threshold and the high-bin threshold may be calculated using Equations:

$$threBinLow \approx (BinNum/2 - 1)/r \times 0.18 \quad (4)$$

$$threBinHigh \approx BinNum - (BinNum/2 - 1)/r \times 0.18 \quad (5)$$

where threBinLow indicates a low-bin threshold, threBinHigh indicates a high-bin threshold, BinNum indicates a total number of bins within a histogram of the block, for example, BinNum=16, and r may be an arbitrary value between 0 and 0.5. Assume that r is set to 0.25: The low-bin threshold is 5 and the high-bin threshold is 11. For each block, pixels falling within Bin0 to Bin5 belong to a dark area while pixels falling within Bin11 to Bin15 belong to a saturate area. For each block, pixNumLow indicating the pixel count of the dark area is accumulated from the Bin0 to Bin5 and pixNumLow indicating the pixel count of the saturate area is accumulated from the Bin11 to Bin15. The processing unit 110 recognizes whether the block type is low-exposure, normal-exposure or high-exposure by the following judgments. Any block is labeled as a first type (normal-exposure) when the pixel count of the dark area pixNumLow is not greater than a block-luminance threshold blocklumthres and the pixel count of the saturate area pixNumHigh is not greater than the block-luminance threshold blocklumthres. Any block is labeled as a second type (low-exposure) when the pixel count of the dark area pixNumLow is greater than the block-luminance threshold blocklumthres. Any block is labeled as a third type (high-exposure) when the pixel count of the saturate area pixNumHigh is greater than the block-luminance threshold blocklumthres. In an embodiment, the block-luminance threshold is associated with a total number of pixels within the block, for example, blocklumthres=blocksize*ratio. In another embodiment, the processing unit 110 further provides a low-luminance-average threshold AveLumLow (for example, 256) and a high-luminance-average threshold AveLumHigh (for example, 3840). Any block is labeled as a second type (low-exposure) if the luminance average of the block AveLum is less than or equals the low-luminance-average threshold AveLumLow. Any block is labeled as a third type (high-exposure) if the luminance average of the block AveLum is greater than or equals the high-luminance-average threshold AveLumHigh. Any block is labeled as a first type (normal-exposure) if the block has not been labeled as the second type or the third type. Exemplary pseudo code for recognizing each block type is as follows:

```
ThrgridL=5; //lowlight bin threshold, thrBlockBinL=((binNum>>1)-1)*0.18/ratio; for (x=0; x<block_cnt_x; x++) {
  for (y=0; y<block_cnt_y; y++) {
    curblockIdx=y*block_cnt_x+x;//block index
    while (i<=ThrblockL) {
      j=binNum-i;
      blockcntltmp+=bestExpBlockInfor[curgIdx].block_hist
        [i];//accumulate from low to high
      blockcnthtmp+=bestExpBlockInfor[curgIdx].block_hist
        [j];//accumulate from high to low
      i++;}
    curBlockAve=m_pBestExpBlockInfor[curgIdx].
      block_averVal;
    b_AveLumMin=(maximum_12 bits+1)>>4;  //average
      low threshold
    b_AveLumMax=(maximum_12 bits+1)-g_KAveLumMin; //average high threshold
    ThrblockCnt=blockSize*0.18;//histogram threshold
    //block label is defined by average and histogram of the block
    isUnder=((Gridcntltmp>thrBlockCnt)         &&
      (g_KAveLumMin>=curBlockAve));
    isOver=((Gridcnthtmp>thrBlockCnt)          &&
      (g_KAveLumMax<=curBlockAve));
    if (isUnder && isOver) {//is over and is under
      blockLabel[curblockIdx]=NORMAL;}//NORMAL=1
    else if (isUnder) {//is under
      blockLabel[curblockIdx]=LOW;}//LOW=0
    else if (isOver) {//is over
      blockLabel[curblockIdx]=HIGH;}//HIGH=2
    else {//is not over and not under
      blockLabel[curblockIdx]=NORMAL;}}}
``` where blockLabel is an array, in which each cell stores one type of block, such as a low-exposure "LOW", a normal-exposure "NORMAL" and a high-exposure "HIGH". In some embodiments, those skilled in the art may devise the design to take both a pixel count of the dark or saturate area and the luminance average of the block AveLum into account. For example, any block is labeled as a second type (low-exposure) if the pixel count of the dark area pixNumLow is greater than a block-luminance threshold blocklumthres and the luminance average of the block AveLum is less than or equals the low-luminance-average threshold AveLumLow. Any block is labeled as a third type (high-exposure) if the pixel count of the saturate area pixNumHigh is greater than the block-luminance threshold blocklumthres and the luminance average of the block AveLum is greater than or equals the high-luminance-average threshold AveLumHigh. Any block is labeled as a first type (normal-exposure) if the block has not been labeled as a low-exposure type or a high-exposure type.

Figure 7:
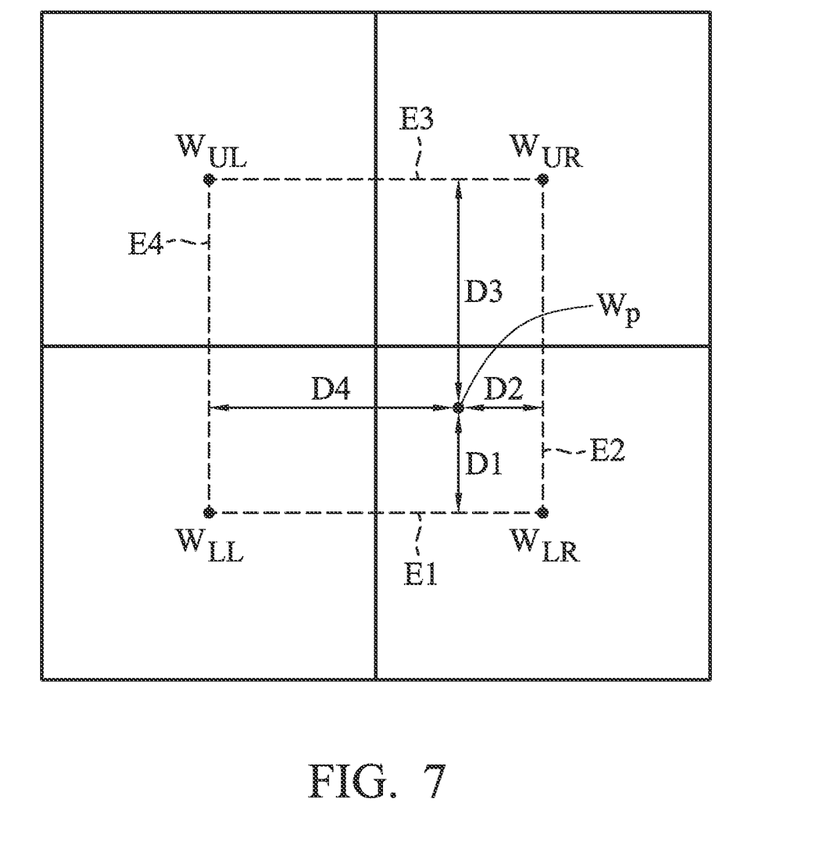
FIG. 7 is a schematic diagram illustrating four surrounding blocks according to an embodiment of the invention.

Subsequently, the processing unit 110 sets the weight of each block (also referred to as a block weight) according to its block type (step S317) and calculates the weight of each pixel of the frame 0 (also referred to as a pixel weight) (step S319). In step S317, specifically, a block weight is set to 0 when the block is labeled as a low-exposure type; a block weight is set to 1 when the block is labeled as a normal-exposure type; and a block weight is set to 2 when the block is labeled as a high-exposure type. Specifically, in step S319, except for pixels located at the boundary and the corner of blocks, the processing unit 110 calculates each pixel weight of the frame 0 according to the four weights of the surrounding blocks and distances from the pixel to the four centers of the surrounding blocks. FIG. 7 is a schematic diagram illustrating four surrounding blocks according to an embodiment of the invention. A rectangle is formed by four center points of surrounding blocks $W_{UL}$, $W_{UR}$, $W_{LL}$ and $W_{LR}$ and includes four edges E1 to E4. Each pixel weight $W_p$ may be calculated using an Equation:

$$W_p = D1 \times D2 \times W_{UL} + D1 \times D4 \times W_{UR} + D3 \times D2 \times W_{LL} + D3 \times D4 \times W_{LR} \quad (6)$$

where $W_{UL}$ indicates a block weight of the upper-left block, $W_{UR}$ indicates a block weight of the upper-right block, $W_{LL}$ indicates a block weight of the lower-left block, $W_{LR}$ indicates a block weight of the lower-right block, D1 indicates a distance from the pixel p to the lower edge E1, D2 indicates a distance from the pixel p to the right edge E2, D3 indicates a distance from the pixel p to the upper edge E3 and D4 indicates a distance from the pixel p to the left edge E4. Each pixel weight of the frame 0 calculated in step S319 will be used in a fusion process of the frame 0 with the frame 1. Details are to be described below.

Figure 4:
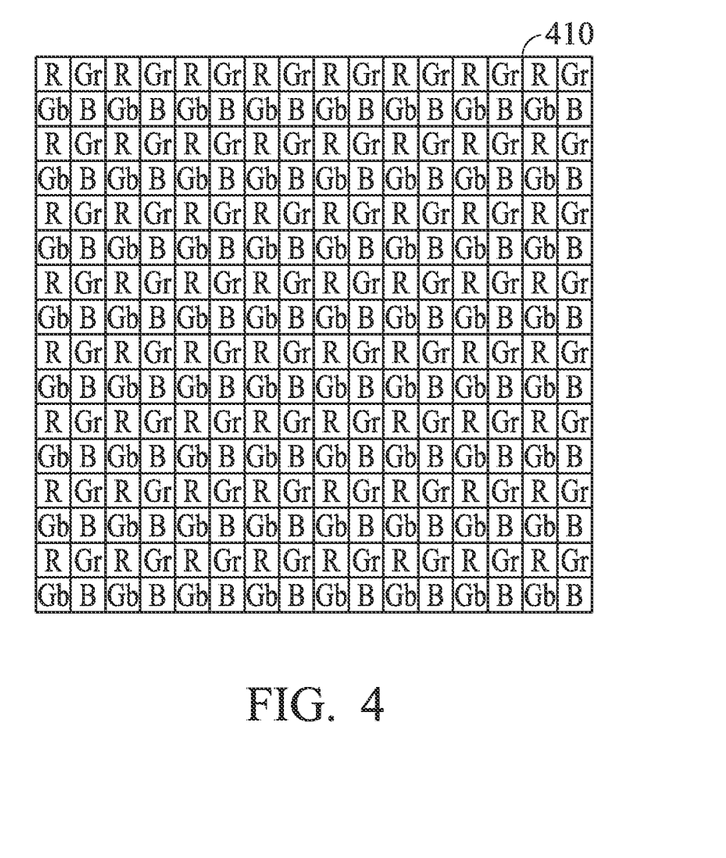
FIG. 4 is a schematic diagram of a Bayer pattern according to an embodiment of the invention.

Now refer back to FIG. 3. After each block type of the frame 0 is labeled (step S315), a first AWB compensation is employed to each block of the frame 0 (step S331). FIG. 4 is a schematic diagram of a Bayer pattern according to an embodiment of the invention. A Bayer pattern 410 is formed, which has alternating R (red)- and Gr (green)-pixels for odd rows and alternating Gb (green)- and B (blue)-pixels for even rows. R-pixels of each block are collectively referred to as an R-channel, Gr-pixels and Gb-pixels of each block are collectively referred to as a G-channel and B-pixels of each block are collectively referred to as a B-channel. In step S331, specifically, the first AWB compensation regards the blocks of the frame 0 labeled as the first type (such as normal-exposure) as an input to adjust all blocks of the frame 0. The first AWB compensation maintains the G-channel and adjusts gains of the R-channel and the B-channel pixels of the frame 0 according to calculation results. In an embodiment, the processing unit 110 calculates pixels of all blocks of the frame 0, which are labeled as the first type (such as normal-exposure), and adjusts R-channel and B-channel gains of all pixels of the frame 0 according to the calculation results.

Figure 6:
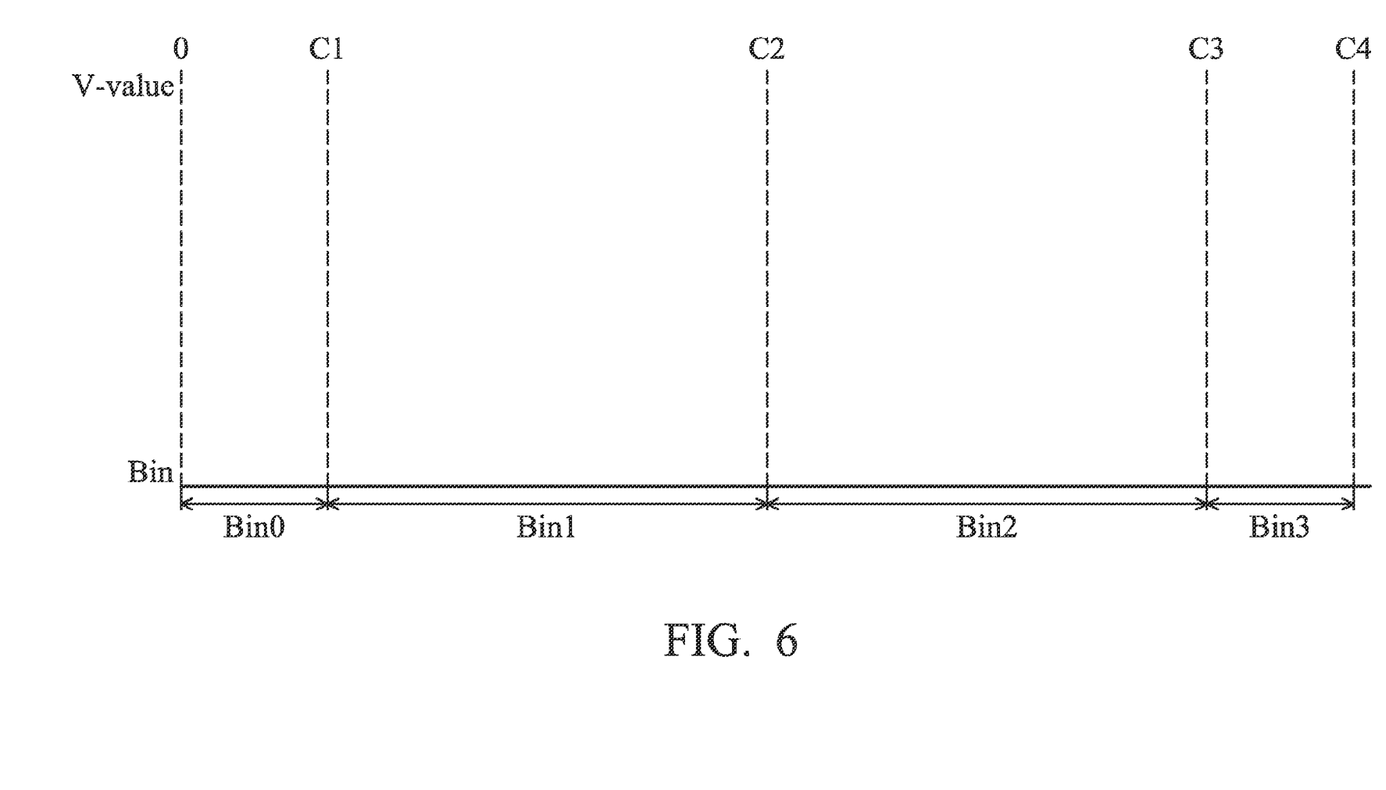
FIG. 6 is a schematic diagram of a luminance histogram for the frame 0 according to an embodiment of the invention.

After completing the AWB compensation to the frame 0, the processing unit 110 obtains statistics information of the frame 0 (steps S351 and S333). In an embodiment, in step S311, the processing unit 110 may convert color space of RGB into that of HSV. Specifically, in steps S351 and S333, the processing unit 110 calculates a luminance histogram of the frame 0. FIG. 6 is a schematic diagram of a luminance histogram for the frame 0 according to an embodiment of the invention. Luminance values of a dark area (Bin0) ranges from 0 to C1 while luminance values of a saturate area (Bin3) ranges from C3 to C4. Although the embodiments give 12-bit luminance values ranging from 0 to 4095 as an example with C1=511, C3=3583 and C4=4095, the invention should not be limited thereto. For the overall frame 0, the processing unit 110 counts how many pixels are presented in each area and calculates a ratio of a first pixel count included in the dark area (also referred to as a dark-pixel count) over a second pixel count included in the saturate area (also referred to as a saturate-pixel count), denoted as shiftRatio. The ratio may be calculated using an Equation:

$$\text{shiftRatio} = \text{pixelNumBin0}/\text{pixelNumBin3} \quad (7)$$

where pixelNumBin0 indicates the first pixel count of the dark area and pixelNumBin3 indicates the second pixel count of the saturate area. Next, the processing unit 110 calculates an expansion multiplier exp_times according to the ratio of the first pixel count over the second pixel count. When the ratio of the dark-pixel count over the saturate-pixel count is less than 8, an Equation (8) may be used to calculate the expansion multiplier exp_times. When the ratio of the dark-pixel count over the saturate-pixel count is greater than or equals 8, an Equation (9) may be used to calculate the expansion multiplier exp_times.

$$\text{exp\_times} = a \times \text{shiftRatio} \times \text{shiftRatio} + b \times \text{shiftRatio} + c \quad (8)$$

$$\text{exp\_times} = d \times \text{shiftRatio} \times \text{shiftRatio} + e \times \text{shiftRatio} + f \quad (9)$$

where a, b, c, d, e and f are floating numbers. Subsequently, the processing unit 110 calculates a first exposure parameter required for processing frame 1 (step S353) and a second exposure parameter required for processing frame 2 (step S335) according to the ratio shiftRatio derived from the statistics information of the frame 0 and exposure settings of the frame 0. The exposure settings include a shutter speed (denoted as sht), an analog gain (denoted as ag) and a digital gain (denoted as dg). The exposure settings may be a multiplier of sht, ag and dg. The first exposure parameter Para1 and the second exposure parameter Para2 may be calculated using Equations:

$$\text{Para1} = sht \times ag \times dg \times \text{exp\_times}/\text{expValue} \quad (10)$$

$$\text{Para2} = sht \times ag \times dg \times \text{exp\_times} \quad (11)$$

where expValue indicates a fixed expansion value being a ratio of the second exposure parameter over the first exposure parameter. In an embodiment of expanding and fusing 12-bit LDR frames to generate an 18-bit HDR frame, expValue=64.

After calculating the second exposure parameter Para2 (step S335), the processing unit 110 expands the frame 0 to HDR space (step S337). In step S337, the exemplary pseudo code used for calculating the first expansion factor of the frame 0 is as follows:

curveMapValNormal=curveTable_AVR[0]×sht×ag× dg+curveTable_AVR[1];

curveMapValHigh=curveTable_AVR[0]×Para2+curveTable_AVR[1];

slope_Normal=curveMapValHigh/curveMapValNormal;

where slope_Normal indicates the first expansion factor of the frame 0, curveTable_AVR[0] is a calibrated slope associated with the image sensor of the camera module 190, curveTable_AVR[1] is a calibrated y-intercept associated with the image sensor of the camera module 190, sht×ag×dg indicates the exposure settings of the frame 0 (where sht indicates the shutter speed of the frame 0, ag indicates the analog gain of the frame 0 and dg indicates the digital gain of the frame 0) and Para2 indicates the second exposure parameter calculated using Equation (11). The processing unit 110 multiplies an HSV value of each pixel in the frame 0 with the first expansion factor slope_Normal to expand the frame 0 to the HDR space.

After calculating the first exposure parameter Para1 (step S353), the processing unit 110 directs the camera module controller 170 to shoot a low-exposure frame (referred to as a frame 1) according to the exposure settings represented by the calculated first exposure parameter Para1, stores that to the frame buffer 130, and employs a second AWB compensation regarding blocks of the frame 1 at the same locations as that of second-type blocks of the frame 0 as an input to adjust each block of the frame 1, where the second-type blocks of the frame 0 are blocks labeled as a second type (for example, low-exposure) (step S356). In an embodiment, pixels of blocks of the frame 1 at the same locations as that of the second-type (such as low-exposure) blocks of the frame 0 are regarded as the input of the statistics calculation, and R-channel and B-channel gains of all pixels of the frame 1 are adjusted according to the calculation results. Detailed calculations of the second AWB compensation depend on which algorithm is employed. In addition, after calculating the second exposure parameter Para2 (step S335), the processing unit 110 directs the camera module controller 170 to shoot a high-exposure frame (referred to as a frame 2) according to the exposure settings represented by the calculated second exposure parameter Para2, stores that to the frame buffer 130, and employs a third AWB compensation regarding blocks of the frame 2 at the same locations as that of third-type blocks of the frame 0 as an input to adjust each block of the frame 2, where the third-type blocks of the frame 0 are blocks labeled as a third type (for example, high-exposure) (step S336). In an embodiment, pixels of blocks of the frame 2 at the same locations as that of the third-type blocks of the frame 0 are regarded as the input of the statistics calculation, and R-channel and B-channel gains of all pixels of the frame 2 are adjusted according to the calculation results. Detailed calculations of the third AWB compensation depend on which algorithm is employed. It should be noted that, in the presented embodiment, the first, second and third AWD compensations are applied to all blocks of the frames 0, 1 and 2, respectively. In some embodiments, when only blocks participating in the statistics calculation of the AWB (i.e., blocks labeled as the first, second, and third types) are participating in the following fusion for output a frame 4, the AWB compensation will only applied to those mentioned blocks. However in the present embodiment, the border may be smoothed when the corresponding AWB compensations are employed to all blocks.

In an embodiment, after calculating the first exposure parameter Para1 (step S353) and the second exposure parameter Para2 (step S335), the processing unit 110 expands the frame 1 to the HDR space (step S357). In step S357, the exemplary pseudo code used for calculating the second expansion factor of the frame 1 is as follows:

curveMapValLow=curveTable_$AVR$[0]×Para1+curveTable_$AVR$[1];

curveMapValHigh=curveTable_$AVR$[0]×Para2+curveTable_$AVR$[1];

slope_Low=curveMapValHigh/curveMapValLow;

where slope_Low indicates the second expansion factor of the frame 1, curveTable_$AVR$[0] is a calibrated slope associated with the image sensor of the camera module 190, curveTable_$AVR$[1] is a calibrated y-intercept associated with the image sensor of the camera module 190, Para1 indicates the first exposure parameter calculated in step S353 according to Equation (10) and Para2 indicates the second exposure parameter calculated in step S335 according to Equation (11). The processing unit 110 multiplies an HSV value of each pixel in the frame 1 with the second expansion factor slope_Low to expand the frame 1 to the HDR space.

In step S359, the expanded frame 0, the expanded frame 1 and the obtained frame 2 obtained in step S311 are compensated. Specifically, the processing unit 110 compensates saturated pixels and dark pixels of the expanded frame 0 using a first exposure compensation method. Specifically, the first exposure compensation method detects dark pixels of the expanded frame 0 (those whose luminance values fall within 0 to 128×slope_Normal, for example) and replaces the luminance values of the detected dark pixels of the expanded frame 0 with luminance pixel values of the frame 2 at the same locations. The first exposure compensation method further detects saturated pixels of the expanded frame 0 (those whose luminance values fall within 3967× slope_Normal to 4095, for example) and replaces the luminance values of the detected saturated pixels of the expanded frame 0 with luminance pixel values of the frame 1 at the same locations. Moreover, the processing unit 110 compensates dark pixels of the expanded frame 1 using a second exposure compensation method. Specifically, the second exposure compensation method detects dark pixels of the expanded frame 1 (those whose luminance values fall within 0 to 128×slope_Low, for example) and replaces the luminance values of the detected dark pixels of the expanded frame 1 with luminance pixel values of the frame 0 at the same locations. Furthermore, the processing unit 110 compensates saturated pixels of the frame 2 using a third exposure compensation method. Specifically, the third exposure compensation method detects saturated pixels of the frame 2 (those whose luminance values fall within 3967 to 4095, for example) and replaces the luminance values of the detected saturated pixels of the frame 2 with luminance pixel values of the frame 0 at the same locations.

It should be noted that the aforementioned steps S337 and S357 for expanding the frames 0 and 1 to the HDR space and step S359 for compensating pixels of the frames 0, 1 and 2 may not be necessary for the AWB compensation. The processing unit 110 generates a frame 3 by fusing the compensated frame 0 with the compensated frame 1 according to pixel weight of each pixel of the frame 0 calculated in step S319 and stores the frame 3 in the frame buffer 150 (step S371). Specifically, in step S371, when a pixel weight of any pixel of the frame 0 is less than or equal to a threshold (e.g. 64), the processing unit 110 fuses the HSV values of this pixel of the frame 0 with the HSV values of the compensated frame 1 at the same location to generate HSV values of the frame 3 at the same location. When a pixel weight of any pixel of the frame 0 is greater than the threshold, the processing unit 110 regards the HSV values of this pixel of the frame 0 as the HSV values of the frame 3 at the same location directly. Exemplary pseudo code for image fusion of the compensated frame 0 with the compensated frame 1 is as follows:

```
if ((1==frameNum) && (pixelweight[index1]<=64))
{//when input frame is frame 1, reference frame is frame 0
    weightRef=pixelweight [index1];
    weightIn=1.0-weightRef;
    outPixH=inputImg→HDRdata[index+0] *weightIn+reflmg→HDRdata[index+0]*weightRef; //H channel fusion
    dst→HDRdata[index]=outPixH;
    outPixS=inputImg→HDRdata[index+1] *weightIn+reflmg→HDRdata[index+1]*weightRef; //S channel fusion
    dst→HDRdata[index+1]=outPixS;
``` outPixV=inputImg→HDRdata[index+2] *weightIn+refImg→HDRdata[index+2] *weightRef; //V channel fusion
  dst→HDRdata[index+2]=outPixV;}
else if ((1==frameNum) && (pixelweight[index1]>64)) {
  outPixH=refImg→HDRdata[index+0]; //H channel from reference frame(frame 0)
  dst→HDRdata[index]=outPixH;
  outPixS=refImg→HDRdata[index+1]; //S channel from reference frame(frame 0)
  dst→HDRdata[index+1]=outPixS;
  outPixV=refImg→HDRdata[index+2]; //V channel from reference frame(frame 0)
  dst→HDRdata[index+2]=outPixV;}
where pixelweight[index1] indicates the weight of the (index1)-th pixel, inputImg represents the compensated frame 1, refImg represents the compensated frame 0 and dst represents the frame 3.

The processing unit 110 generates a frame 4 by fusing the frame 3 with the compensated frame 2 according to pixel weight of each pixel of the frame 0 calculated in step S319 and stores the frame 4 in the frame buffer 150 (step S373). The frame 4 is the final HDR frame. In step S373, specifically, when a pixel weight of any pixel of the frame 0 is greater than a threshold, the processing unit 110 fuses the HSV values of this pixel of the frame 3 with the HSV values of the compensated frame 2 at the same location to generate HSV values of the frame 4 at the same location. When a pixel weight of any pixel of the frame 0 is not greater than the threshold, the processing unit 110 regards the HSV values of this pixel of the frame 3 as the HSV values of the frame 4 at the same location directly. Exemplary pseudo code for image fusion of the frame 3 with the compensated frame 2 is as follows:
if ((2==frameNum) && (pixelweight[index1]>1.0)) {//input frame is frame 2,ref frame is fusion result of frame 0, 1
  weightIn=pixelweight[index1]-1;
  weightRef=1.0-weightIn;
  outPixH=inputImg→HDRdata[index+0] *weightIn+refImg→HDRdata[index+0]*weightRef;
  dst→HDRdata[index]=outPixH;
  outPixS=inputImg→HDRdata[index+1] *weightIn+refImg→HDRdata[index+1] *weightRef;
  dst→HDRdata[index+1]=outPixS;
  outPixV=inputImg→HDRdata[index+2] *weightIn+refImg→HDRdata[index+2] *weightRef;
  dst→HDRdata[index+2]=outPixV;}
else {
  outPixH=refImg→HDRdata[index+0];
  dst→HDRdata[index]=outPixH;
  outPixS=refImg→HDRdata[index+1];
  dst→HDRdata[index+1]=outPixS;
  outPixV=refImg→HDRdata[index+2];
  dst→HDRdata[index+2]=outPixV;}
where pixelweight[index1] indicates the weight of the (index1)-th pixel, inputImg represents the compensated frame 2, refImg represents the frame 3 and dst represents the frame 4.

Although the embodiment has been described in FIG. 1 as having specific elements, it should be noted that additional elements may be included to achieve better performance without departing from the spirit of the invention. While the process flows described in FIGS. 2 and 3 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for AWB (Automatic White Balance) compensation, performed by a general-purpose processor, the method comprising:
   acquiring a frame 0;
   dividing the frame 0 into a plurality of blocks;
   obtaining block statistics information of each block of the frame 0;
   labeling each block of the frame 0 as one of a plurality of types according to its block statistics information;
   employing a first AWB compensation to the frame 0 with an input of first-type blocks of the frame 0, wherein the first-type blocks of the frame 0 are blocks labeled as a first type;
   employing a second AWB compensation to a frame 1 with an input of blocks of the frame 1 at the same locations as that of second-type blocks of the frame 0, wherein the second-type blocks of the frame 0 are blocks labeled as a second type; and
   fusing the compensated frame 0 with the compensated frame 1.

2. The method of claim 1, wherein the step for employing a first AWB compensation to the frame 0 with an input of the first-type blocks further comprises:
   regarding pixels of the first-type blocks of the frame 0 as an input to participate in statistics calculation; and
   adjusting gains of R-channel and B-channel pixels of the frame 0 according to calculation results.

3. The method of claim 1, wherein any block is labeled as the first type when a pixel count of a dark area of a luminance histogram of said block is not greater than a block-luminance threshold and a pixel count of a saturate area of the luminance histogram of said block is not greater than the block-luminance threshold.

4. The method of claim 3, wherein the luminance histogram of said block is divided into a plurality of bins, each pixel of said block is distributed to one bin according to its luminance value, and wherein said dark area comprises the bins from the first bin to one bin having a low-bin threshold, and the saturate area comprises the bins from one bin having a high-bin threshold to the last bin.

5. The method of claim 1, wherein any block is labeled as a second type when a pixel count of a dark area of a luminance histogram of said block is greater than a block-luminance threshold.

6. The method of claim 1, wherein any block is labeled as the first type when a luminance average of said block falls between a low-luminance-average threshold and a high-luminance-average threshold.

7. The method of claim 1, further comprising:
   acquiring a frame 2;
   employing a third AWB compensation to the frame 2 with an input of blocks of the frame 2 at the same locations as that of third-type blocks of the frame 0, wherein the third-type blocks of the frame 0 are blocks labeled as a third type; and fusing the compensated frame 2 with the fusing result of the compensated frame 0 with the compensated frame 1.

8. The method of claim 7, wherein the frame 2 is a high-exposure frame, and any block is labeled as the third type when a pixel count of a saturate area of a luminance histogram of said block is greater than a block-luminance threshold.

9. The method of claim 1, wherein the frame 0 is a normal-exposure frame and the frame 1 is a low-exposure frame.

10. The method of claim 1, further comprising:
setting a block weight according to the type of each block;
calculating a plurality of pixel weights of the frame 0 according to the block weights; and
fusing the compensated frame 0 with the compensated frame 1 according to the pixel weights.

11. The method of claim 10, wherein the pixel weight is calculated by an Equation:

$$W_p = D1 \times D2 \times W_{UL} + D1 \times D4 \times W_{UR} + D3 \times D2 \times W_{LL} + D3 \times D4 \times W_{LR},$$

where $W_p$ indicates a pixel weight of one pixel of frame 0, $W_{UL}$ indicates a block weight of an upper-left block, $W_{UR}$ indicates a block weight of an upper-right block, $W_{LL}$ indicates a block weight of a lower-left block, $W_{LR}$ indicates a block weight of a lower-right block, D1 indicates a distance from the pixel to a lower edge, D2 indicates a distance from the pixel to a right edge, D3 indicates a distance from the pixel to an upper edge and D4 indicates a distance from the pixel to a left edge.

12. An apparatus for AWB (Automatic White Balance) compensation, comprising:
a camera module controller, coupled to an image sensor;
a general-purpose processor acquiring a frame 0 via the camera module controller; dividing the frame 0 into a plurality of blocks; obtaining block statistics information of each block of the frame 0; labeling each block of the frame 0 as one of a plurality of types according to its block statistics information; employing a first AWB compensation to the frame 0 with an input of first-type blocks of the frame 0, wherein the first-type blocks of the frame 0 are blocks labeled as a first type; employing a second AWB compensation to a frame 1 with an input of blocks of the frame 1 at the same locations as that of second-type blocks of the frame 0, wherein the second-type blocks of the frame 0 are blocks labeled as a second type; and fusing the compensated frame 0 with the compensated frame 1.

13. The apparatus of claim 12, wherein the general-purpose processor regards pixels of the first-type blocks of the frame 0 as an input to participate in statistics calculation; and adjusts gains of R-channel and B-channel pixels of the frame 0 according to calculation results.

14. The apparatus of claim 12, wherein any block is labeled as the first type when a pixel count of a dark area of a luminance histogram of said block is not greater than a block-luminance threshold and a pixel count of a saturate area of the luminance histogram of said block is not greater than the block-luminance threshold.

15. The apparatus of claim 14, wherein the luminance histogram of said block is divided into a plurality of bins, each pixel of said block is distributed to one bin according to its luminance value, and wherein said the dark area comprises the bins from the first bin to one bin having a low-bin threshold, and the saturate area comprises the bins from one bin having a high-bin threshold to the last bin.

16. The apparatus of claim 12, wherein any block is labeled as a second type when a pixel count of a dark area of a luminance histogram of said block is greater than a block-luminance threshold.

17. The apparatus of claim 12, wherein any block is labeled as the first type when a luminance average of said block falls between a low-luminance-average threshold and a high-luminance-average threshold.

18. The apparatus of claim 12, wherein the general-purpose processor acquires a frame 2; employs a third AWB compensation to the frame 2 with an input of blocks of the frame 2 at the same locations as that of third-type blocks of the frame 0, wherein the third-type blocks of the frame 0 are blocks labeled as a third type; and fuses the compensated frame 2 with the fusing result of the compensated frame 0 with the compensated frame 1.

19. The apparatus of claim 18, wherein the frame 2 is a high-exposure frame, and any block is labeled as the third type when a pixel count of a saturate area of a luminance histogram of said block is greater than a block-luminance threshold.

20. The apparatus of claim 12, wherein the frame 0 is a normal-exposure frame and the frame 1 is a low-exposure frame.

21. The apparatus of claim 12, wherein the general-purpose processor sets a block weight according to the type of each block; calculates a plurality of pixel weights of the frame 0 according to the block weights; and fuses the compensated frame 0 with the compensated frame 1 according to the pixel weights.

22. The apparatus of claim 21, wherein the pixel weight is calculated by an Equation:

$$W_p = D1 \times D2 \times W_{UL} + D1 \times D4 \times W_{UR} + D3 \times D2 \times W_{LL} + D3 \times D4 \times W_{LR},$$

where $W_p$ indicates a pixel weight of one pixel of frame 0, $W_{UL}$ indicates a block weight of an upper-left block, $W_{UR}$ indicates a block weight of an upper-right block, $W_{LL}$ indicates a block weight of a lower-left block, $W_{LR}$ indicates a block weight of a lower-right block, D1 indicates a distance from the pixel to a lower edge, D2 indicates a distance from the pixel to a right edge, D3 indicates a distance from the pixel to an upper edge and D4 indicates a distance from the pixel to a left edge.

* * * * *